Patented May 30, 1944

2,350,294

UNITED STATES PATENT OFFICE 2,350,294

METHOD OF PRESERVING LATEX AND PRODUCT THEREOF

William D. Stewart, Akron, Ohio, assignor to The B. F. Goodrich Company, New York, N. Y., a corporation of New York No Drawing. Application December 21, 1940, Serial No. 371,203

11 Claims. (Cl. 260—820)

This invention relates to a method of preserving latex, particularly fresh latex, and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory.

I have discovered a method of preserving latex, particularly freshly-collected latex that produces a sterile, stable latex that will stand for long periods without putrefaction or coagulation. By the method of this invention the pH of the fresh latex is adjusted to a point not less than 9.8 nor more than 10.0 by means of buffer solutions, alkalies, or the like. The preferred manner is by adding ammonia to the latex in from 0.25% to 0.35% by weight of the latex. To this latex is then added small proportions of one or more of those aromatic compounds having the structural formula R—X wherein R is an aromatic nucleus and X is a member of the class consisting of nitro radicals, amino nitrogen atoms, and —COOY radicals where Y is a member of the class consisting of metals and ammonium radicals. These compounds comprise inorganic salts of aromatic acids such as bismuth subgallate, potassium guaicol sulfonate, ammonium benzoate, sodium salicylate, sodium sulfo-salicylate, sodium formaldehyde, sulfoxylate, sodium phenoxide, sodium ricinoleate, and potassiubm phenolate; nitro derivatives of aromatic compounds such as p-nitrophenol, p-nitro-acetanilide, m-nitro-aniline, nitro-benzoic acid, and alpha-nitro naphthalene; and amino derivatives of aromatic compounds such as p-amino phenol, aminobenzoic acid, 2-amino-8-naphthol-6-sulfonic acid, and amino-H-acid. The compounds are preferably used in amounts ranging from not less than 0.05% to not more than 0.20% by weight of the latex although greater or smaller amounts may be used if desired. Those compounds that are acid should be neutralized with an alkali before being added to the latex. The compounds may be added either before or after the pH of the latex has been adjusted to the specified range of 9.8 to 10.0 and if necessary the pH may be readjusted after addition of the compound or compounds. The latex should be treated by the method of the invention without any undue interval of time after it has been collected from the trees, preferably within eighteen hours after such collecting.

Fresh latex that has been recently collected from the trees may be preserved by the method of this invention in a manner similar to that of the following examples:

*Example I.*—Ammonia is added to fresh latex until the pH is raised to 9.8, and immediately thereafter 0.08% of sodium salicylate by weight of the latex is added to the latex. This results in a latex that will remain well-preserved for an extended period of time.

*Example II.*—Ammonia is added to fresh latex until the pH is raised to 10.0 and then, without undue delay, 0.14% of p-nitro-acetanilide by weight of the latex is added to the latex. The treated latex is then sealed in containers for shipment or storage.

*Example III.*—Ammonia is added to fresh latex until the pH is raised to 9.9 and immediately thereafter 0.20% of p-amino phenol by weight of the latex is added to the latex. This results in a well-preserved latex that will remain sweet and uncoagulated for long periods of time and that will require no blowing off of ammonia at the factory.

As will be apparent from the foregoing the preserved latex prepared according to this invention ordinarily will contain only the natural latex itself and the ammonia or other material added in adjusting the pH together with the inorganic salts of aromatic acids, the nitro derivatives of aromatic compounds, and the amino derivatives of aromatic compounds as described. Any of the usual compounding or conditioning agents may later be added as desired to prepare the latex for specific uses but such materials preferably are not added at the plantation.

The method of this invention produces a latex that will remain well-preserved over long periods of time with no danger of putrefaction and coagulation and although the method is more useful for preserving freshly-collected latex it is also applicable for and produces excellent results with latex that has been previously preserved by other methods.

Having disclosed my invention it is my desire to protect it broadly within the spirit and scope of the appended claims.

I claim:

1. The method of preserving freshly-collected latex which comprises treating the latex with sufficient ammonia to raise the pH of the latex to not less than 9.8 nor more than 10.0 and adding a small proportion of a nitro derivative of an aromatic compound selected from the class consisting of p-nitrophenol, p-nitro-acetanilide, m-nitro-aniline, nitro-benzoic acid, and alpha-nitro-naphthalene.

2. The method of preserving freshly-collected latex which comprises treating the latex with sufficient ammonia to raise the pH of the latex to not less than 9.8 nor more than 10.0 and adding not less than 0.05% nor more than 0.20% by weight of the latex of a nitro derivative of an aromatic compound selected from the class consisting of p-nitrophenol, p-nitro-acetanilide, m-nitro-aniline, nitro-benzoic acid, and alpha-nitro-naphthalene.

3. Preserved latex having a pH not less than 9.8 nor more than 10.0 and containing ammonia and not less than 0.05% nor more than 0.20% by weight of the latex of a nitro derivative of an aromatic compound selected from the class consisting of p-nitrophenol, p-nitro-acetanilide, m-nitro-aniline, nitro-benzoic acid, and alpha-nitro-naphthalene.

4. The method of preserving latex which comprises adjusting the pH of the latex to not less than 9.8 nor more than 10.0 and adding a small proportion of a nitro derivative of an aromatic compound selected from the class consisting of p-nitrophenol, p-nitro-acetanilide, m-nitro-aniline, nitro-benzoic acid, and alpha-nitro-naphthalene.

5. The method of preserving freshly-collected latex which comprises adjusting the pH of the latex to not less than 9.8 nor more than 10.0 and adding a small proportion of a nitro derivative of an aromatic compound selected from the class consisting of p-nitrophenol, p-nitro-acetanilide, m-nitro-aniline, nitro-benzoic acid, and alpha-nitro-naphthalene.

6. The method of preserving freshly-collected latex which comprises treating the latex with sufficient alkali to raise the pH to not less thn 9.8 nor more than 10.0 and adding a small proportion of a nitro derivative of an aromatic compound selected from the class consisting of p-nitrophenol, p-nitro-acetanilide, m-nitro-aniline, nitro-benzoic acid, and alpha-nitro-naphthalene.

7. The method of preserving freshly-collected latex which comprises adjusting the pH of the latex to not less than 9.8 nor more than 10.0 and adding not less than 0.05% nor more than 0.20% by weight of the latex of a nitro derivative of an aromatic compound selected from the class consisting of p-nitrophenol, p-nitro-acetanilide, m-nitro-aniline, nitro-benzoic acid, and alpha-nitro-naphthalene.

8. The method of preserving freshly-collected latex which comprises treating the latex with sufficient alkali to raise the pH to not less than 9.8 nor more than 10.0 and adding not less than 0.05% nor more than 0.20% by weight of the latex of a nitro derivative of an aromatic compound selected from the class consisting of p-nitrophenol, p-nitro-acetanilide, m-nitro-aniline, nitro-benzoic acid, and alpha-nitro-naphthalene.

9. Preserved latex having a pH not less than 9.8 nor more than 10.0 and containing a small proportion of a nitro derivative of an aromatic compound selected from the class consisting of p-nitrophenol, p-nitroacetanilide, m-nitro-aniline, nitro-benzoic acid, and alpha-nitro-naphthalene.

10. Preserved latex having a pH not less than 9.8 nor more than 10.0 and containing an alkali and a small proportion of a nitro derivative of an aromatic compound selected from the class consisting of p-nitrophenol, p-nitro-acetanilide, m-nitro-aniline, nitro-benzoic acid, and alpha-nitro-naphthalene.

11. Preserved latex having a pH not less than 9.8 nor more than 10.0 and containing ammonia and a small proportion of a nitro derivative of an aromatic compound selected from the class consisting of p-nitrophenol, p-nitro-acetanilide, m-nitro-aniline, nitro-benzoic acid, and alpha-nitro-naphthalene.

WILLIAM D. STEWART.